United States Patent
Naughton

(10) Patent No.: US 7,897,087 B2
(45) Date of Patent: Mar. 1, 2011

(54) METHOD OF MANUFACTURING A MOLDED ARTICLE

(76) Inventor: David B. Naughton, Oxford, MI (US)

(*) Notice: Subject to any disclaimer, the term of this patent is extended or adjusted under 35 U.S.C. 154(b) by 479 days.

(21) Appl. No.: 10/840,022

(22) Filed: May 5, 2004

(65) Prior Publication Data

US 2005/0248057 A1    Nov. 10, 2005

(51) Int. Cl.
B29C 45/14    (2006.01)
(52) U.S. Cl. .................. 264/259; 264/328.1; 264/309
(58) Field of Classification Search .................. 264/226, 264/486, 484, 483, 446, 431, 439
See application file for complete search history.

(56) References Cited

U.S. PATENT DOCUMENTS

| | | | |
|---|---|---|---|
| 3,871,060 A * | 3/1975 | Ladney, Jr. .................... 29/428 |
| 4,350,739 A * | 9/1982 | Mohiuddin ................ 428/425.1 |
| 4,608,415 A * | 8/1986 | Nakajima et al. ........... 525/111.5 |
| 4,937,288 A * | 6/1990 | Pettit et al. .................... 525/176 |
| 5,000,903 A | 3/1991 | Matzinger et al. |
| 5,030,681 A * | 7/1991 | Asato et al. ................... 524/504 |
| 5,087,514 A | 2/1992 | Graefe |
| 5,370,831 A * | 12/1994 | Blair et al. .................... 264/460 |
| 5,385,196 A * | 1/1995 | Hanano ............................ 164/72 |
| 5,425,969 A * | 6/1995 | Wakabayashi et al. ....... 427/470 |
| 5,571,470 A | 11/1996 | Plester |
| 5,571,472 A * | 11/1996 | Shiraiwa ....................... 264/439 |
| 5,746,961 A * | 5/1998 | Stevenson et al. ............ 264/255 |
| 5,858,472 A * | 1/1999 | Iwata et al. .................... 427/536 |
| 5,906,787 A | 5/1999 | Plester |
| 6,001,292 A | 12/1999 | Atake |
| 6,007,759 A | 12/1999 | Ten Tije et al. |
| 6,720,074 B2 * | 4/2004 | Zhang et al. ............... 428/842.4 |
| 2003/0141620 A1 * | 7/2003 | Stevenson et al. ............ 264/129 |
| 2003/0228485 A1 | 12/2003 | Yusa et al. |

* cited by examiner

*Primary Examiner* — Monica A Huson
(74) *Attorney, Agent, or Firm* — Brinks Hofer Gilson & Lione

(57) ABSTRACT

A method of manufacturing a molded article with a mold having an inner surface is provided. The method includes the steps of applying a substance to the inner surface of the mold, introducing a thermoplastic resin into the mold and onto the substance, defining a molded article having a surface, and maintaining contact of the thermoplastic resin and the substance for a predetermined time period. The thermoplastic resin has a predetermined heated energy and at least a portion of the heat energy is transferred to the substance. During the predetermined time period, the substance diffuses through at least a portion of the surface of the molded article.

5 Claims, 4 Drawing Sheets

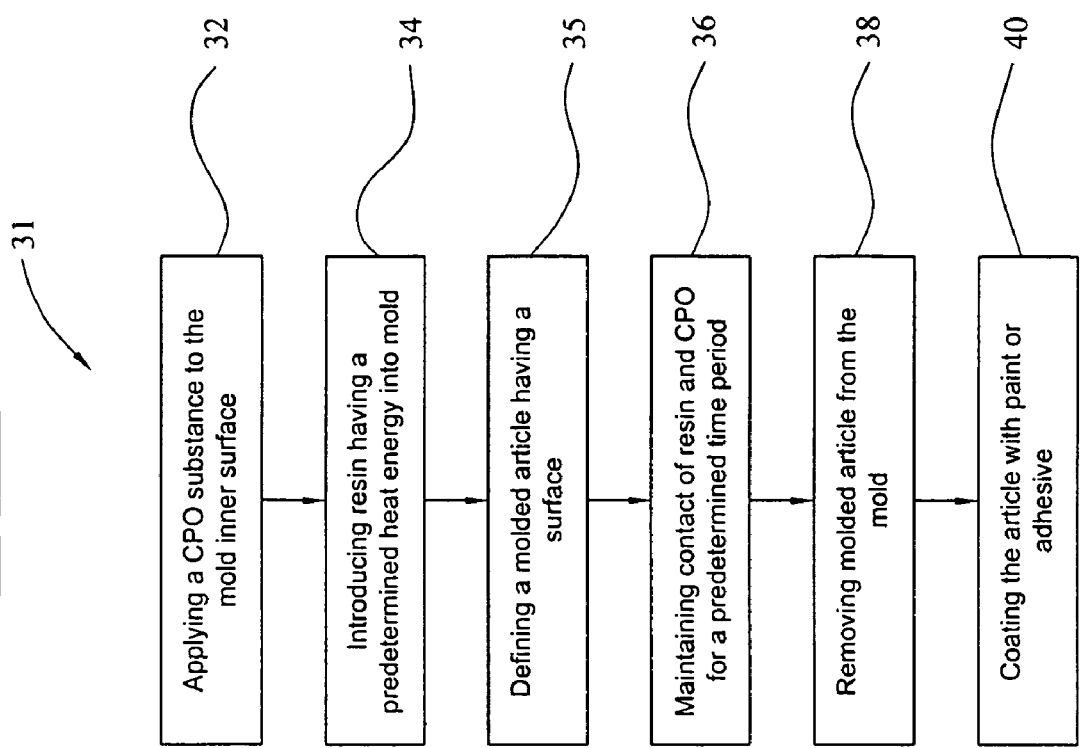

METHOD OF MANUFACTURING A MOLDED ARTICLE

BACKGROUND OF THE INVENTION

The present invention relates generally to a molded article and, more particularly, to method of injection molding an article having a modified surface for enhanced adhesion.

Polyolefins have many desirable physical properties, and are often used to create molded articles. These molded articles have a wide range of applications, such as automotive interior panels and decorative components. Polyolefins have low surface energy leading to issues of bonding with surface coatings, such as adhesives or paint. Therefore, surface modification is typically implemented to increase the surface energy of a polyolefin-based article and to improve bonding between the article and adhesives or other coatings.

Unmodified polyolefins typically have a surface energy of approximately 30 dynes/cm, but a surface energy of 38-50 dynes/cm (or higher) is desired to more effectively bond adhesives or other coatings to the polyolefin article. Thus, in many situations, polyolefin articles often undergo surface modification after the articles are formed. This process may be termed post-polymerization surface modification. Such post-polymerization surface modifications include additional manufacturing steps and tooling part complexity.

Corona discharge is a post-polymerization surface modification resulting in oxidation of the polyolefin surface. During corona discharge, an electrical source generates a current across an area where treatment is to be applied. The emission of electrons in the air near the surface of the polyolefin article generates ions and free radicals which in turn oxidize the surface of the article. This oxidation typically occurs 2 nanometers (nm) past the article surface, and it typically raises the surface energy of the article to a level where adhesion is possible (38-50 dynes/cm). The corona discharge method may be undesirable for various reasons. For example, due to the relatively shallow depth of oxidation, the positive effects of corona discharge may be reversed over time if the article is exposed to the environment. Additionally, the corona discharge method is often less effective on curved surfaces than it is on flat surfaces.

Plasma discharge is another post-polymerization surface modification resulting in oxidation of the polyolefin article. Plasma discharge is a method similar to corona discharge except that the oxidation process takes place within a vacuum. The method used and the inherent problems associated with plasma discharge are similar to those associated with corona discharge. This oxidation typically occurs 2 nm deep past the article surface, leading to possible reversal of the effects over time. Although the plasma discharge method is more effective with curved or irregular shaped parts than the corona discharge method, the plasma discharge method requires additional manufacturing components and costs associated with the need for sealing the article within a vacuum.

Flame treatment is a post-polymerization surface modification resulting in oxidation of the surface of the polyolefin article. During the method of flame treatment, gas burners generate a flame that causes oxidation in the surface of the molded article. The extent that the molded article undergoes oxidation is generally controlled by two variables, the air/gas ratio and the distance between the flame and the article. These variables often cause inconsistent oxidation in the surface of the article, particularly with curved or irregular shaped parts. Also, the oxidation typically occurs 2 nm deep past the article surface, which leads to possible reversal of the effects over time. Additionally, air currents may interfere with the flame treatment. Furthermore, other general problems associated with fire hazards and working with an open flame may occur.

The chemical treatment method is a method of post-polymerization surface modification of the polyolefin article resulting in surface oxidation. Chemical methods typically used an aqueous potassium dichromate-sulfuric acid solution in order to oxidize the surface of the article. However, the hazardous nature of this solution creates high waste disposal costs and undesirable health hazards. Additionally, the treatment may result in degradation of the polymer surface.

Increasing surface roughness is a method of post-polymerization surface modification of the article without oxidation. The article surface roughness may be increased by sanding or roughing the article after it is formed, thereby increasing the surface area of the article. Additionally, the inner surface of the mold may undergo a special tooling process in order to create a rough surface of the article during part formation. However, neither technique of increasing surface roughness effectively increases adhesion to the article despite the increase in surface area from surface roughing. Additionally, the special tooling required for roughing the inner surface of the mold increases manufacturing complexity.

Solvent base primers may be used for post-polymerization surface modification resulting in increased polarization of the article surface. The solvent based primer typically used in this method is a low solid (~5%) solution of chlorinated polyolefin dissolved in a high Kauri Butenol solvent or compounded with film forming resins and additives. The solvent aids in penetration or diffusion of the primer into the surface of the plastic. After the solvent evaporates, the polar halogenated polymer is anchored into the article surface. This method requires the steps of spraying or dipping the article into the above described solvent based primer as well as the additional steps of drying the article. Moreover, this method requires further manufacturing components necessary to promote drying because the solvent based primer typically requires drying conditions higher than room temperature. Such manufacturing components may include an oven for drying the solvent based primer or a dust free, dry staging area for evaporation of the same. Furthermore, the solvents used are toluene, xylene, or other flammable materials which require special handling and permits due to their high volatile organic compounds (V.O.C.).

In addition to having low surface energy, unmodified polyolefins have low conductivity. Conductive articles are often painted or otherwise coated using an electrostatic operation wherein particles of the coating substance are given an electrostatic charge and sprayed onto an electrically grounded article. The charged particles and the grounded article form a magnetic attraction, promoting an evenly-coated article. However, if the article has low conductivity, the magnetic force between the two components is relatively weak or non-existent. Polyolefin particles have low conductivity, and therefore are currently modified to increase surface conductivity via methods similar to those described above with respect to surface modification for increasing surface energy. More specifically, methods of improving surface conductivity require post-polymerization surface modification, and result in additional manufacturing steps and manufacturing tooling complexity.

Therefore, it is desirable to reduce the process complexity and reduce the manufacturing part complexity for surface modification of polyolefin articles.

BRIEF SUMMARY OF THE INVENTION

In overcoming the disadvantages and drawbacks of the known technology, the current invention provides an improved method for manufacturing a molded article.

One aspect of the current invention is to manufacture a molded article with a mold having an inner surface. The method includes the steps of: applying a substance to the inner surface of the mold, introducing a thermoplastic resin on the substance in the mold to transfer at least a portion of the heat energy of the thermoplastic resin to the substance, defining a molded article having a surface, and maintaining contact of the thermoplastic resin and the substance for a pre-determined time period to diffuse the chlorinated polyolefin through at least a portion of the surface of the molded article.

In one embodiment of the present invention, the substance includes chlorinated polyolefin for increasing the surface energy of the portion of the molded article for enhanced adhesion. In one aspect of this embodiment, the chlorinated polyolefin includes a chlorinated polyolefin powder. In an alternative aspect of this embodiment, the chlorinated polyolefin includes a chlorinated polyolefin solution.

In another embodiment of the present invention, the substance includes an electrically conductive substance for increasing the conductivity of the portion of the molded article. The electrically conductive substance may be selected from the group consisting of carbon, graphite, silver, nickel, and copper.

In yet another aspect of the present invention, the substance includes a plurality of particles. The method further comprises the steps of applying an electrical charge to the plurality of particles and electrically grounding the mold.

In another aspect of the present invention, the method further includes the steps of allowing the thermoplastic resin to harden into the molded article and removing the molded article from the mold. In this aspect of the present invention, the molded article has a surface energy of at least 38 dynes per centimeter after the molded article is removed from the mold.

BRIEF DESCRIPTION OF THE DRAWINGS

FIG. 2a is a flowchart for an embodiment of a general method for manufacturing a molded article similar to the article shown in FIG. 1;

FIG. 2b is a flowchart for the embodiment of the method for manufacturing a molded article in FIG. 2a, further showing various exemplary alternatives for the step of applying a CPO substance to the mold inner surface in FIG. 2a.

DETAILED DESCRIPTION OF THE INVENTION

Figure 1:
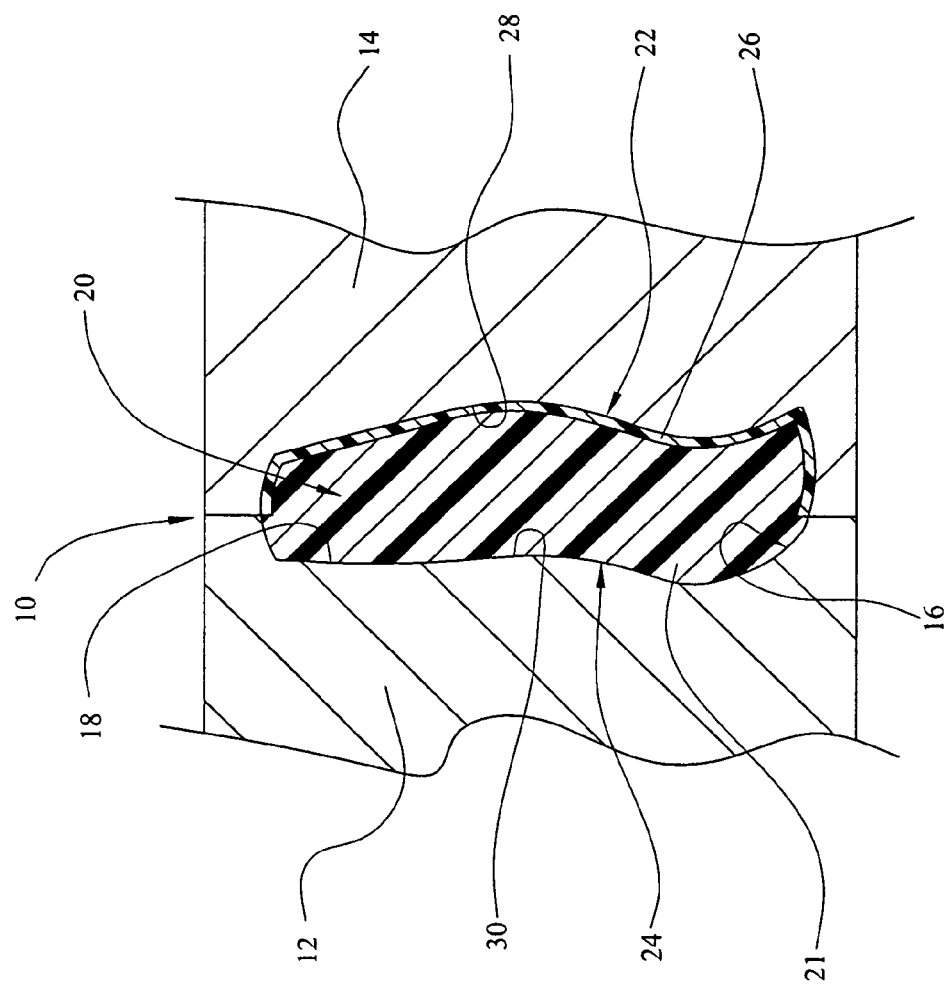
FIG. 1 is a cross sectional view of a mold enclosing a molded article having a surface-modified portion and an unmodified portion in accordance with the one embodiment of the present invention.

Referring now the present invention, FIG. 1 shows a mold 10 having a first section 12 and second section 14, and defining a cavity 16. The mold 10 shown in FIG. 1 preferably receives a heated substance, such as thermoplastic resin. One such mold may be an injection molding apparatus generally known in the art. This injection molding apparatus injects thermoplastic resin into the mold 10 at a predetermined mold pressure. However, it is to be noted that any appropriate molding apparatus may be used with the mold 10.

The mold 10 includes a mold inner surface 18 defining the cavity 16. A molded article 20 is shown in FIG. 1 enclosed within the cavity 16 and having a shape corresponding to the shape of the mold inner surface 18. The molded article 20 may be used for a wide range of applications, such as an interior panel or a decorative component for a vehicle. The molded article 20 is preferably comprised of a thermoplastic polyolefin resin 21 injected into the mold 10. More specifically, the thermoplastic resin 21 may include polypropylene, polyethylene, thermoplastic olefin, TPO, or blends thereof.

Due to the various applications of the molded article 20, it is often desirable to coat the molded article 20 with a coating, such as paint or adhesive. However, polyolefins typically have a relatively low surface energy due to their non-polar characteristics and thus the bonds between the polyolefin and the coating are generally weak. Therefore, it is desirable to modify desired portions of the molded article 20 in order to increase bond strength between the molded article 20 and the coating.

Similarly, it is often desirable to use an electrostatic painting process to coat the molded article 20. More specifically, particles of the coating material are electrically charged and the molded article 20 is electrically grounded in order to create a magnetic force between the respective components and to promote the coating process. However, polyolefins typically have a relatively low conductivity. Therefore, it is desirable to modify desired portions of the molded article 20 in order to increase magnetic force between the molded article 20 and the coating particles.

The surface of the molded article 20 shown in FIG. 1 includes a Class A portion 22 and a Class B portion 24. The Class A portion 22 is defined as the portion of the molded article 20 that will be covered with a coating (not shown), such as paint or adhesive, during later stages of the manufacturing process. Therefore, it is desirable for the Class A portion 22 of the molded article 20 to include a substance 26 having the above-described desired characteristics, such as high surface energy, high conductivity, or both. The Class B portion 24 is defined as the portion of the molded article 20 that will not be covered with a coating. Therefore it is not necessary for the Class B portion to include the substance 26. Depending on the desired use for the molded article 20, and more particularly depending on the percentage of the molded article 20 that is to be coated, the entire surface of the molded article 20 may be designated as the Class A portion 22.

The substance 26 may include various materials depending on the desired purpose of the molded article 20. In the case where it is desirable for the substance 26 to have a high surface energy, the substance 26 preferably includes a generally polar material, such as chlorinated polyolefin. In the case where it is desirable for the substance 26 to have a high conductivity, the substance 26 preferably includes an electrically conductive material, such as carbon, graphite, silver, nickel, or copper.

As shown in FIG. 1, the mold 10 includes a first portion 28 and a second portion 30 of mold 10. The first portion 28 corresponds with the Class A portion 22 of the molded article 20 and the second portion 30 corresponds to the Class B portion 24 of the molded article 20, as will be discussed further below with respect to the methods of manufacturing the molded article. In the case where the entire surface of the molded article 20 is designated as the Class A portion 22, the mold 10 preferably only includes a first portion 28.

Figure 2B:
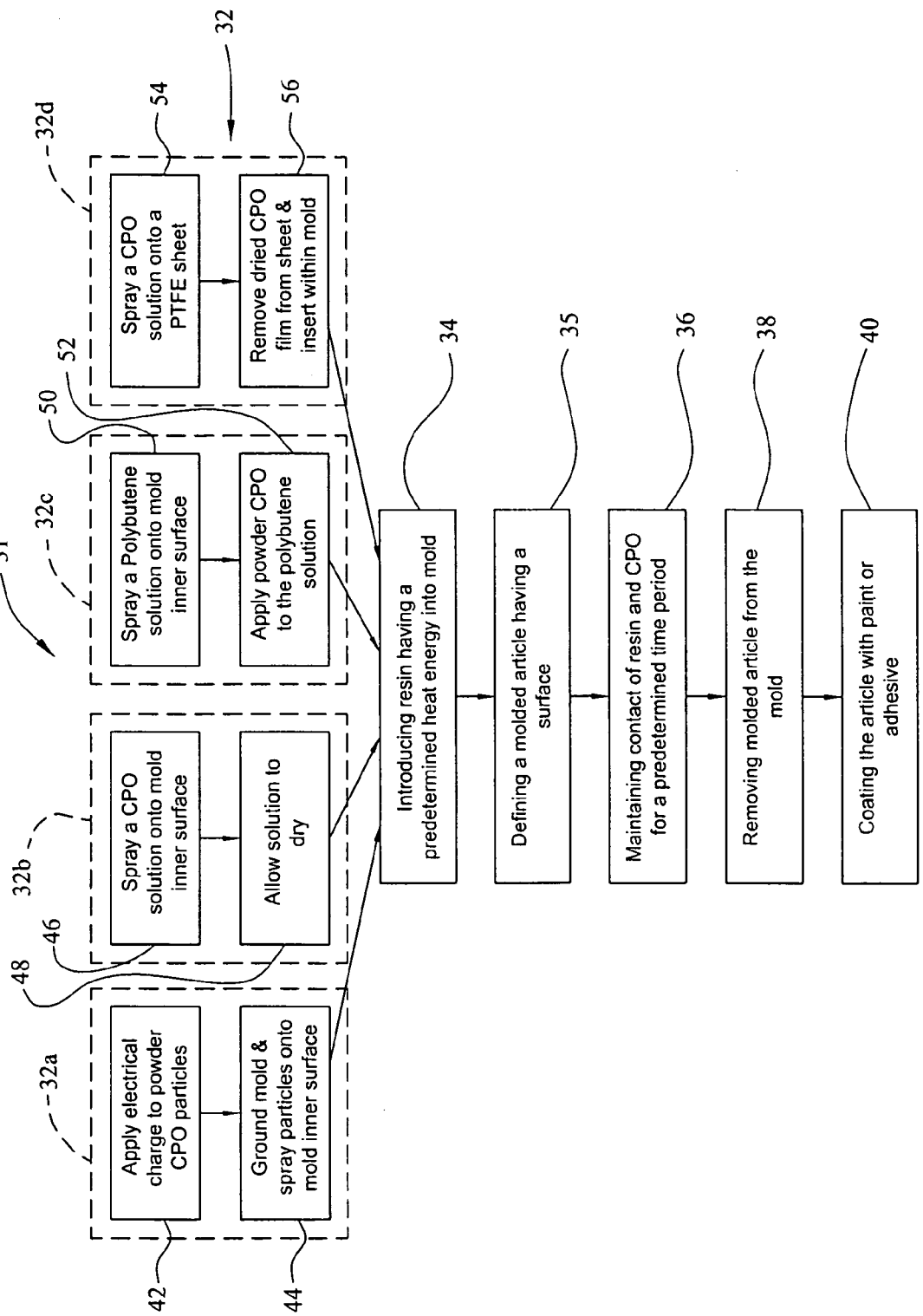

Referring to FIG. 2a, a method 31 of manufacturing a molded article similar to the molded article 20 shown in FIG. 1 will now be generally discussed. This method 31 produces a molded article 20 having a Class A portion 22 with a relatively high surface energy of between 38 and 50 dynes/cm (or higher). The first step this method 31 is preferably introducing the substance 26 to the first portion 28 of the mold 10, indicated by reference number 32. The first step 32 is specifically illustrated with four alternative exemplary steps, 32a, 32b, 32c, and 32d which will be discussed in more detail below with respect to FIG. 2b.

After step 32 of introducing the substance 26 to the first portion 28 of the mold, step 34 in the method 31 is to introduce thermoplastic resin 21 having a predetermined heat energy into the mold 10 onto the substance 26 to transfer at least a portion of the heat energy of the thermoplastic resin 21 to the substance 26. Therefore, the temperature of the thermoplastic resin 21 is preferably greater than the temperature of the substance 26 when the thermoplastic resin 21 is inserted into the mold 10. More preferably, when it is inserted into the mold the thermoplastic resin 21 preferably has a temperature of approximately 190 degrees Celsius for one grade of thermoplastic resin and a heat energy in Joules corresponding to the grade and type polymer of the thermoplastic resin. As discussed above, the second step 34 may be accomplished via an injection molding apparatus or another appropriate molding tool.

Next, in step 36 the molded article 20 is defined having the Class A portion 22. The molded article 20 is preferably defined substantially simultaneously with the hardening of the thermoplastic resin.

Next, in step 36 shown in FIG. 2a, contact between the thermoplastic resin 21 and the substance 26 is maintained for a predetermined time period. During this predetermined time period, such as between 2 and 6 minutes, the substance 26 diffuses through the first portion 29 of the molded article 20 surface in order to form the Class A portion 22. As a result of this diffusion, the Class A portion 22 has a higher surface energy than the Class B portion 24 and thus has an enhanced adhesion quality.

Step 38 of the method 31 shown in FIG. 2a is to remove the molded article 20 from the mold 10. The mold is opened and the molded article 20 may be removed from the mold 10, preferably after the thermoplastic resin 21 has sufficiently hardened and cooled.

Step 40 of the method 31 shown in FIG. 2a includes coating the molded article 20 with a coating such as paint or adhesive. The entire molded article 20 may be coated with the coating as desired, and as is known in the current art. Alternatively, only a portion of the molded article 20, such as the Class A portion 22, is coated with the coating. In one preferred coating process, the molded article 20 is electrically grounded and an electrostatic charge is applied to the particles of the coating in order to create a magnetic connection between the molded article and the particles. In another coating process, the article is dipped directly into the coating.

Referring to FIG. 2b, various exemplary alternatives of step 32 will now be discussed. A first exemplary process 32a shown in FIG. 2b generally includes chlorinated polyolefin in powdered form. Step 42 of this process 32a is to apply an electrical charge to powdered chlorinated polyolefin particles. Step 44 of this process 32a, preferably occurring simultaneously as the step 42, is to electrically ground the mold 10 and to spray the chlorinated polyolefin powder particles onto the first portion 28 of the mold inner surface 18. The spraying operation in step 44 may be accomplished by an automated process, such as by a robotic arm (not shown). During this process 32a, a magnetic connection is preferably formed between the powdered particles and the mold inner surface 18 to promote a substantially evenly distributed coating of powder particles along the mold inner surface 18. In the case where the first portion 28 of the mold 10 is less than the mold inner surface 18, it may be desirable to electrically ground only the first portion 28 of the mold to effectively limit the distribution of chlorinated polyolefin powder particles to the first portion 28 of the mold 10. To simplify this selective grounding process, one section of the mold 12 or 14 preferably defines the first portion 28 of the mold 10 and the other section of the mold 12 or 14 defines the second portion 30.

Another exemplary process 32b shown in FIG. 2b generally includes a chlorinated polyolefin solution. Step 46 of this process 32b is preferably to spray a chlorinated polyolefin solution onto the first portion 28 of the mold inner surface 18. Step 48 is to allow the chlorinated polyolefin solution to dry before introducing the thermoplastic resin 21 in step 34. The spraying operation in step 46 may be accomplished by an automated process, such as by a robotic arm. Alternatively, the spraying process in step 46 may be accomplished by a manual process. The spraying process in step 46 preferably includes a nozzle (not shown) commonly known in the art to substantially evenly distribute the chlorinated polyolefin solution along the first portion 28 of the mold inner surface 18.

Yet another exemplary process 32c shown in FIG. 2b generally includes an adhesive solution and a powdered chlorinated polyolefin solution. Step 50 of this process 32c is preferably to spray an adhesive solution onto the first portion 28 of the mold inner surface 18 in order to form a tacky surface. The adhesive solution is preferably a polybutene solution, but it may be any appropriate solution for forming a tacky surface. Once the tacky surface is formed, the next step 52 is to apply powdered chlorinated polyolefin to the tacky surface such that the powder sticks to the solution. Another optional step to this process 32c, which is not shown in FIG. 2b, is to remove the excess chlorinated polyolefin powder from the tacky surface in order to create an even coating of the powder.

Still another exemplary process 32d shown in FIG. 2b generally includes a chlorinated polyolefin solution and a Polytetrafluoroethylene (PTFE) sheet. Step 54 of this process 32d is preferably to spray a chlorinated polyolefin solution onto a sheet comprised of PTFE or another low adhesive material. The PTFE sheet is commonly marketed under the trade name TEFLON®. Step 56 in this process 32d is to remove the dried chlorinated polyolefin film from the sheet and insert the film within the mold 10. The film is positioned within the mold 10 such as to be aligned with the first portion 28 of the mold inner surface 18.

Although four exemplary processes 32a, 32b, 32c, 32d have been discussed, alternative processes may be used with the method described in FIG. 2b. Additionally, various steps of these processes 32a, 32b, 32c, and 32d may be interchanged as appropriate.

Figure 3:
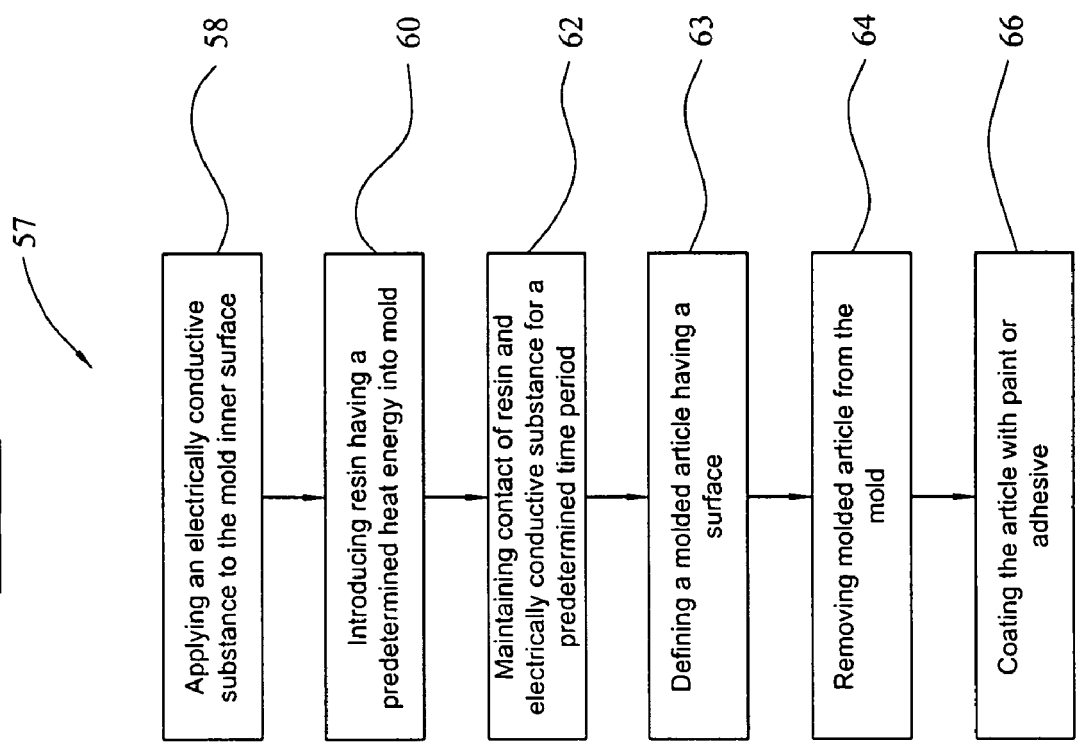
FIG. 3 is a flowchart for an alternative embodiment of the general method for manufacturing a molded article similar to the one shown in FIG. 1.

Referring to FIG. 3, a method 57 of manufacturing a molded article similar to the molded article 20 shown in FIG. 1 will now be discussed. This method 57 produces a molded article 20 having a Class A portion 22 with a relatively high conductivity. Step 58 is preferably applying an electrically conductive substance to the mold inner surface 18. Step 58 may be accomplished by processes similar to the various exemplary processes described with respect to step 32 in FIG. 2b. The electrically conductive substance may be in powdered form, in a solution, or embodied in an alternative medium. Additionally, the electrically conductive substance may be mixed with chlorinated polyolefin in order to increase both the surface energy and the electric conductivity of the molded article 20 as desired. As discussed above, the electrically conductive substance may include carbon, graphite, silver, nickel, or copper.

Similarly to the method 31 described in FIGS. 2a and 2b, the method 57 includes the step 60 of introducing thermoplastic resin 21 having a predetermined heat energy into the mold 10. Step 62 of the method 57 includes maintaining contact of the thermoplastic resin 21 and the electrically conductive substance for a predetermined time period. Step 63 of the method 57 is defining a molded article 21 having a surface, step 64 is removing the molded article 20 from the mold 10, and step 66 is coating the molded article 10 with paint or adhesive. These steps 64, 66 are respectively similar to the steps 38, 40 in the method 31 described above.

It is intended that the foregoing detailed description be regarded as illustrative rather than limiting, and that it be understood that it is the following claims, including all equivalents, that are intended to define the spirit and scope of this invention.

The invention claimed is:

1. A method of manufacturing a high surface energy molded article with an injection mold having an inner surface, the method comprising:
　applying a chlorinated polyolefin to a low adhesive sheet to form a chlorinated polyolefin film;
　removing the chlorinated polyolefin film from the low adhesive sheet;
　applying the chlorinated polyolefin film to the inner surface of the injection mold;
　introducing a thermoplastic resin having a temperature of at least 190 degrees Celsius on the chlorinated polyolefin film in the injection mold, the thermoplastic resin having a predetermined heat energy, to transfer at least a portion of the heat energy of the thermoplastic resin to the chlorinated polyolefin film;
　defining a molded article having a surface;
　maintaining contact of the thermoplastic resin and the chlorinated polyolefin film for a predetermined time period to diffuse the chlorinated polyolefin film through at least a portion of the surface of the molded article; and
　increasing the surface energy of the portion of the molded article for enhanced adhesion.

2. The method for manufacturing a high surface energy molded article in claim 1, wherein the step of applying the chlorinated polyolefin to the low adhesive sheet includes spraying a plurality of chlorinated polyolefin particles to the low adhesive sheet.

3. The method for manufacturing a high surface energy molded article in claim 1, wherein the chlorinated polyolefin is a powder.

4. The method for manufacturing a high surface energy molded article in claim 2, wherein the chlorinated polyolefin is a chlorinated polyolefin solution.

5. The method of manufacturing a high surface energy molded article in claim 1, further comprising the steps of allowing the thermoplastic resin to harden into the molded article and removing the molded article from the mold, wherein the portion of the molded article has a surface energy of at least 38 dynes per centimeter after the step of removing the molded article from the mold.

* * * * *